C. SCHMIDT.
SAFETY CRANK.
APPLICATION FILED FEB. 11, 1919.

1,344,521.

Patented June 22, 1920.
3 SHEETS—SHEET 1.

Inventor
C. Schmidt
By Victor J. Evans
Attorney

C. SCHMIDT.
SAFETY CRANK.
APPLICATION FILED FEB. 11, 1919.
1,344,521.
Patented June 22, 1920.
3 SHEETS—SHEET 2.
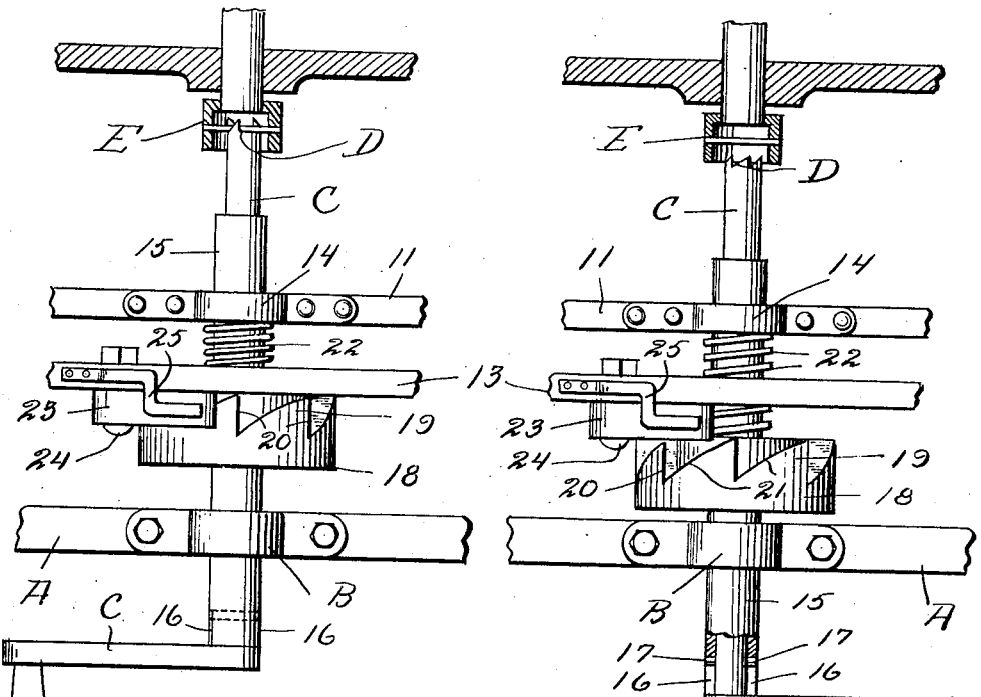
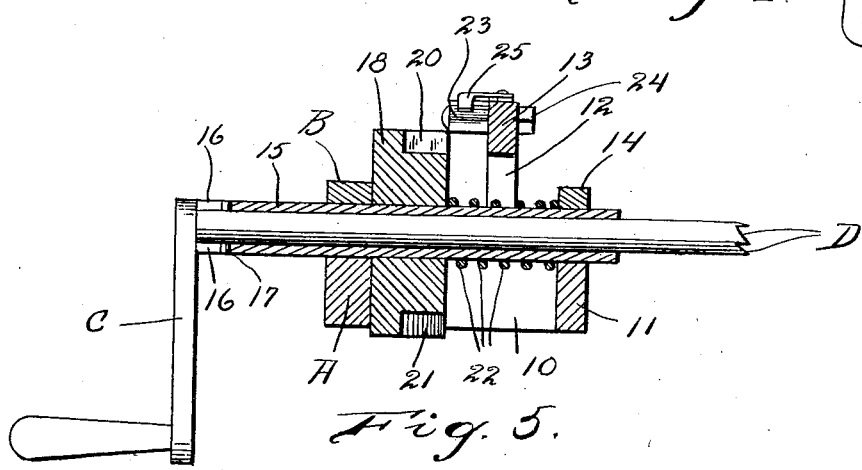
Inventor
C. Schmidt
By Victor J. Evans
Attorney

C. SCHMIDT.
SAFETY CRANK.
APPLICATION FILED FEB. 11, 1919.

1,344,521. Patented June 22, 1920.
3 SHEETS—SHEET 3.

INVENTOR.
C. Schmidt
BY
Victor J. Evans
ATTORNEY.

UNITED STATES PATENT OFFICE.

CHRIST SCHMIDT, OF MONROE, WASHINGTON.

SAFETY-CRANK.

1,344,521.  Specification of Letters Patent.  Patented June 22, 1920.

Application filed February 11, 1919. Serial No. 276,305.

*To all whom it may concern:*

Be it known that I, CHRIST SCHMIDT, a citizen of the United States, residing at Monroe, in the county of Snohomish and State of Washington, have invented new and useful Improvements in Safety-Cranks, of which the following is a specification.

This invention relates to cranking devices for the internal combustion engines of motor vehicles, and has for its object the provision of means mounted upon the forward cross bar of the frame of a motor vehicle and associated with the ordinary starting crank whereby upon back firing of the engine the crank will be automatically retracted from engagement with the forward end of the crank shaft of the engine so that breaking of the operator's arm caused by "kicking back" of the engine will be prevent.

More specifically the object of the invention is the provision of a hollow guide shaft revolubly mounted upon the front cross bar of the vehicle frame and adapted for operative engagement by the crank, this guide shaft having secured thereon a ratchet coöperating with a pawl against the end of which the inclined faces of the ratchet teeth engage for wedging the ratchet outwardly upon reverse movement of the ratchet caused by back firing of the engine, this outward movement of the ratchet resulting in retracting of the crank from engagement with the end of the crank shaft of the engine.

An important object is the provision of a device of this character in which the pawl is resiliently urged into engagement with the ratchet whereby the end of the pawl will always be in position to engage against the inclined sides of the ratchet teeth so that wedging action will be insured for forcing the ratchet, guide shafts and consequently the cranks outwardly.

With the above and other objects and advantages in view, the invention consists in the details of construction to be hereinafter more fully described and claimed, and illustrated in the accompanying drawing in which:—

Fig. 3 is a view similar to Fig. 2 showing the ratchet pushed in, in act of cranking the engine.

Fig. 4 is a similar view showing the ratchet pushed partly outward during back firing of the engine and Fig. 5 is a longitudinal sectional view through the device.

Figure 1:
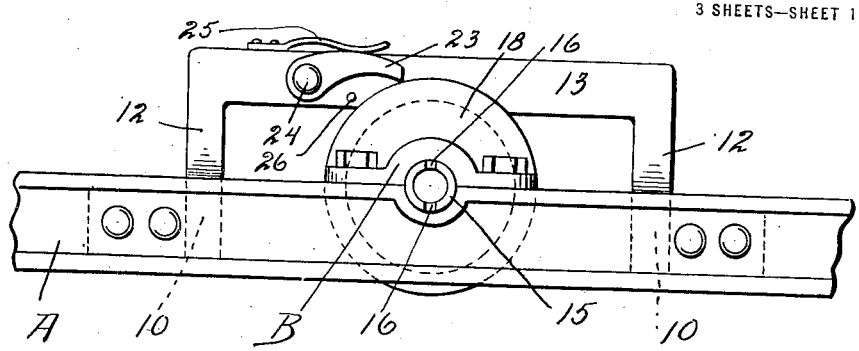
Figure 1 is a front elevation of the forward portion of the frame of a motor vehicle showing my device applied thereto.

Referring more particularly to the drawing the letter A designates the front cross bar of the vehicle frame and B designates the usual bearing mounted thereon and through which the crank is inserted for cranking the engine. The crank is designated by the numeral C and has its end provided with teeth D engageable with the usual ratchet E carried by the forward end of the crank shaft.

In carrying out my invention I provide an auxiliary frame secured to the front cross bar A and comprising side members 10 having secured to the ends thereof a bar 11 arranged parallel with the front cross bar A, this frame further including uprights 12 having secured to the upper ends thereof a bar 13 disposed in spaced parallel relation to and between the bars 10 and 11. The bar 11 is provided with a bearing 14 similar to the bearing B.

Figure 2:
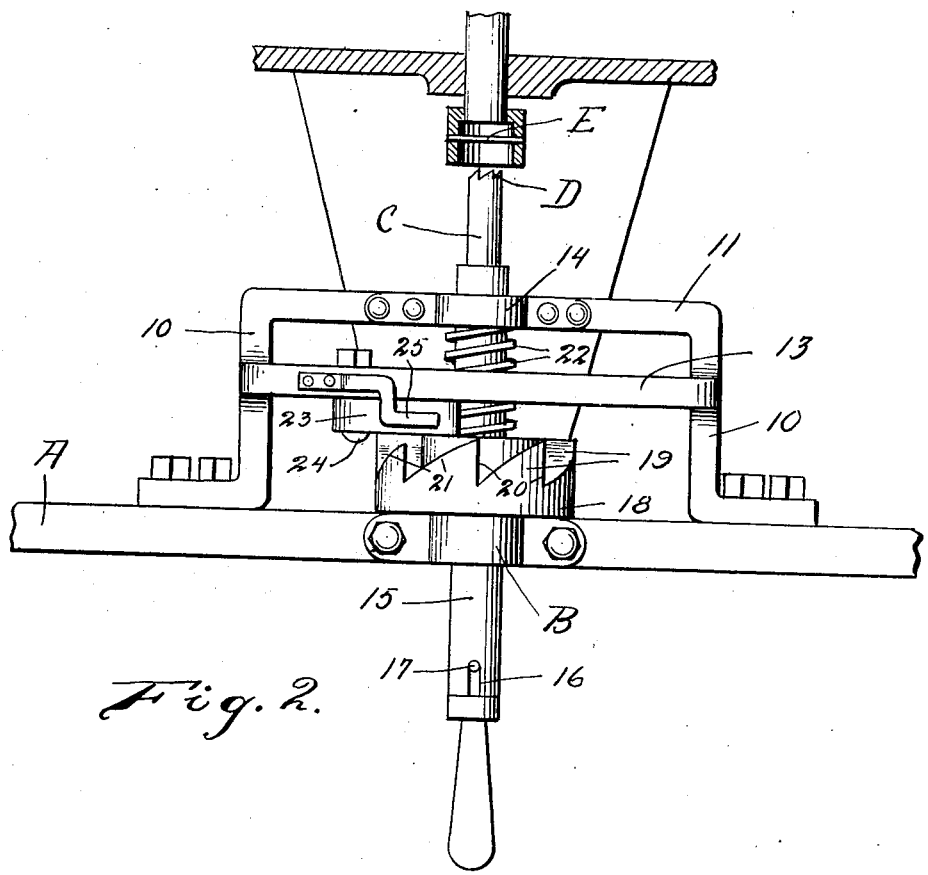
Fig. 2 is a top plan view showing my device in its normal or inoperative position.

A hollow shaft 15 is revolubly and slidably mounted within the bearings B and 14 and is provided at its outer end with diametrically opposite slots 16 engageable by laterally extending pins 17 on the crank C. A disk 18 is secured upon the hollow shaft 15 and has its periphery formed with a plurality of teeth 19 having straight ends 20 and inclined faces 21. A coiled spring 22 encircles the hollow shaft 15 and has one end bearing against the disk 18 and its other end bearing against the bar 11 for holding the disk 18 against the inner side of the cross bar A. This is the normal or inoperative position of the device and is clearly shown in Fig. 2 of the drawing. A pawl 23 is pivoted upon the bar 13 of the auxiliary frame, as shown at 24, and is adapted for coöperation with the teeth 19 of the disk 18. The pawl 23 is urged into engagement with the teeth of the disk 18 by a suitable spring 25 and its movement under the influence of this spring is limited by a stop pin 26 extending outwardly from the bar 13.

The operation of the device is as follows:—The crank C is inserted through the hollow shaft 15 until the laterally extending pins 17 are disposed within the ends of the slot 16 after which, the operator presses upon the crank until the ratchet disk 18 is moved, against the resistance of the spring 22, substantially into engagement with the bar 13 of the auxiliary frame. The teeth D upon the end of the crank will then engage the starting crank ratchet E in the usual manner. The operator then rotates the crank in a clock-wise direction to effect a starting of the engine. This position of the parts is clearly illustrated in Fig. 3 of the drawing and it will be noted that when the crank is rotated, the hollow shaft 15 and also the toothed disk 18 will also be rotated. As the disk 18 turns, the pawl 23 will snap over the straight ends 20 of the teeth 19. In the event that the engine back fires, the crank shaft thereof and also the hollow shaft 15 and the toothed disk 18 will start to rotate in the opposite direction. When such reverse rotation of the ratchet disk 18 occurs, the inclined face 21 of whichever tooth is engaged by the pawl 23 will bear against the end of the pawl. This engagement of the inclined face of the tooth with the end of the pawl will result in wedging the ratchet disk 18 outwardly toward the cross bar A, which movement will result in retraction of the crank C so that its teeth will be disengaged from the starting crank ratchet E.

From the foregoing description and a study of the drawings it will be apparent that I have thus provided a device whereby upon back firing of a motor the crank will be automatically disengaged from connection with the crank shaft so that the reverse movement thereof will be prevented from affording any injury to the operator manipulating the crank.

Figure 6:
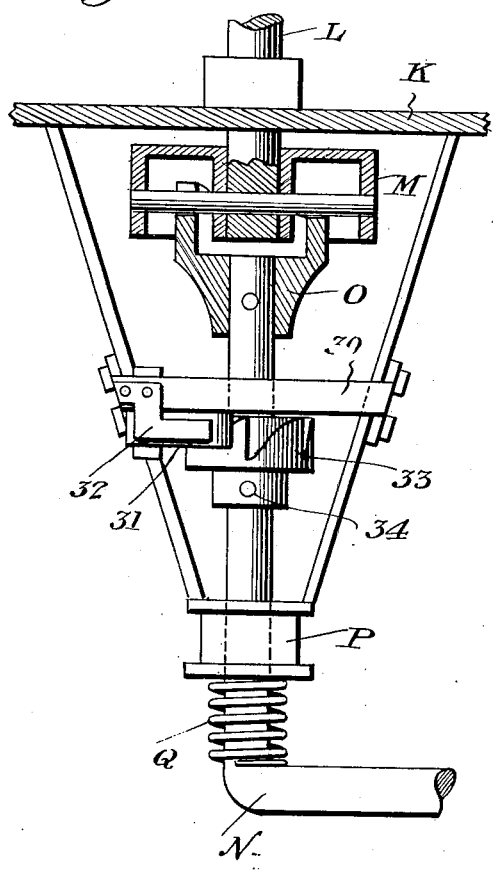
Fig. 6 is a view partly in plan and partly in longitudinal section, showing my device arranged for use upon an automobile engine of a popular make having a permanently attached crank and showing the parts in cranking position.
Figure 7:
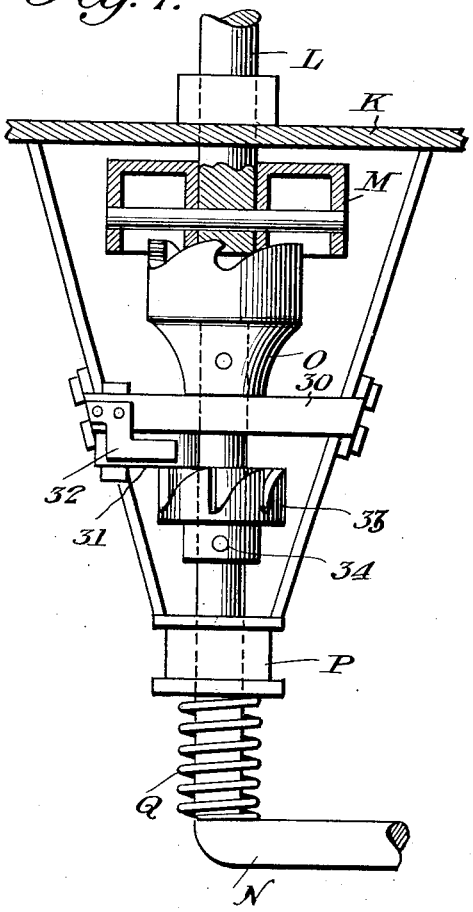
Fig. 7 is a similar view showing the ratchet in thrown off position.

The device as described above is particularly adapted for use upon that type of automobile engine provided with a removable crank. In order to adapt my construction for use upon certain makes of automobiles, such as the Ford, in which the crank is permanently attached to the frame, I employ the construction shown in Figs. 6 and 7. Referring to these figures in detail, the letter K designates a portion of the front of the engine through which extends the shaft L provided with the starting crank clutch member M. The crank is designated by the letter N and carries at one end the starting crank ratchet O which coöperates with the member M. The crank N extends through the front bearing member P and is provided with the usual spring Q normally tending to hold the starting crank O out of engagement with the member M. In carrying out my invention in connection with this type of starting crank mechanism, I provide a cross bar 30, which is secured transversely upon the front portion of the engine, as shown, and upon this bar I provide a pivoted pawl 31 engaged by a spring 32 also secured upon the bar 30. The ratchet 33 is secured directly upon the crank end in any suitable manner, as by a pin 34 and coöperates with the pawl 31. In the operation of this form the crank is pushed inwardly against the resistance of the spring Q in the ordinary manner and the engine is cranked, the pawl 31 riding over the periphery of the ratchet 33. In the event that the engine kicks back the pawl 31 will engage against the inclined surfaces of the ratchet teeth and will force the ratchet and consequently the crank outwardly so as to disengage the members O and M. In fact, the operation is exactly the same as in the previously described form, the only difference being the changes in construction necessary to adapt the device for use upon non-removable cranks.

Having thus described my invention I claim:—

A safety crank for the internal combustion engines of motor vehicles, comprising a horizontally disposed U-shaped auxiliary frame secured upon the front cross bar of the frame of a motor vehicle, a longitudinally movable hollow shaft journaled in said frame and provided at its outer end with slots, a crank extending through and movable with said hollow shaft and formed for engagement with the starting ratchet of the engine, pins on said crank disposed within said slots, a ratchet wheel secured upon said shaft, teeth formed on the periphery of said ratchet wheel and having straight ends parallel with the axis of said wheel and having inclined side faces, an inverted U-shaped bar secured to said auxiliary frame, a spring pressed pawl pivoted upon said bar and engageable upon said teeth, said pawl riding idly over the straight edges of said teeth upon rotation of said ratchet wheel in a clockwise direction, the free end of said pawl riding upon the inclined face of any one of said teeth upon reverse rotation of said ratchet wheel whereby to exert a wedging action for moving said ratchet wheel and hollow shaft outwardly with resultant retraction of said crank from operative connection with the crank shaft of the engine.

In testimony whereof I affix my signature.

CHRIST SCHMIDT.